(12) United States Patent
Song et al.

(10) Patent No.: US 10,094,991 B2
(45) Date of Patent: Oct. 9, 2018

(54) MODULE STRUCTURE

(71) Applicant: WUHAN TELECOMMUNICATION DEVICES CO., LTD., Wuhan (CN)

(72) Inventors: Beili Song, Wuhan (CN); Benqing Quan, Wuhan (CN); Yi Jiang, Wuhan (CN); Fanrong Gao, Wuhan (CN)

(73) Assignee: WUHAN TELECOMMUNICATION DEVICES CO., LTD., Wuhan (CN)

( * ) Notice: Subject to any disclaimer, the term of this patent is extended or adjusted under 35 U.S.C. 154(b) by 0 days.

(21) Appl. No.: 15/576,855

(22) PCT Filed: Sep. 10, 2015

(86) PCT No.: PCT/CN2015/089299
§ 371 (c)(1),
(2) Date: Nov. 27, 2017

(87) PCT Pub. No.: WO2016/192234
PCT Pub. Date: Dec. 8, 2016

(65) Prior Publication Data
US 2018/0172927 A1    Jun. 21, 2018

(30) Foreign Application Priority Data
Jun. 1, 2015 (CN) .......................... 2015 1 0291772

(51) Int. Cl.
*G02B 6/26* (2006.01)
*G02B 6/42* (2006.01)
(Continued)

(52) U.S. Cl.
CPC ............. *G02B 6/4219* (2013.01); *G02B 6/26* (2013.01); *G02B 6/42* (2013.01); *G02B 6/4261* (2013.01);
(Continued)

(58) Field of Classification Search
CPC ........... G02B 6/4219; G02B 6/26; G02B 5/00
See application file for complete search history.

(56) References Cited

U.S. PATENT DOCUMENTS

| 6,247,849 B1* | 6/2001 | Liu ...................... G02B 6/3849 385/55 |
| 7,542,732 B2* | 6/2009 | Ka ....................... G02B 6/4201 385/139 |

(Continued)

FOREIGN PATENT DOCUMENTS

| CN | 101614850 A | 12/2009 |
| CN | 102183826 A | 9/2011 |

(Continued)

*Primary Examiner* — Ryan Lepisto
(74) *Attorney, Agent, or Firm* — Gokalp Bayramoglu

(57) ABSTRACT

The present invention provides a module structure, which is adapted for the optical-electric module field in the field of optical communication. The module structure comprises a torsional spring that is fixed to a bail; the torsional spring comprises a left torsional spring and a right torsional spring that are symmetrically provided on the bail; the left torsional spring comprises a first supporting rod, a first screw hole, a first connecting rod and a second screw hole that are sequentially connected; the second screw hole is nested outside a third rotation shaft of the bail, the first screw hole is nested outside the first rotation shaft after passing through the L-shaped-rod formed first connecting rod, and the direction of the first supporting rod is upwardly inclining and forms an angle of less than 90° with the plane where the bail is located. The module has good shielding effect.

10 Claims, 10 Drawing Sheets

(51) Int. Cl.
    *G02B 5/00*     (2006.01)
    *H01R 13/6583*  (2011.01)
(52) U.S. Cl.
    CPC .............. *G02B 5/00* (2013.01); *G02B 6/4246* (2013.01); *G02B 6/4292* (2013.01); *H01R 13/6583* (2013.01)

(56) References Cited

U.S. PATENT DOCUMENTS

| | | | |
|---|---|---|---|
| 9,472,898 B2* | 10/2016 | Yang | H01R 13/6395 |
| 9,954,316 B2* | 4/2018 | Song | G02B 6/4202 |
| 2004/0062493 A1* | 4/2004 | Ishigami | G02B 6/3897 |
| | | | 385/92 |
| 2009/0274468 A1* | 11/2009 | Zhang | G02B 6/4201 |
| | | | 398/139 |

FOREIGN PATENT DOCUMENTS

| | | |
|---|---|---|
| CN | 203519884 U | 4/2014 |
| CN | 104617445 A | 5/2015 |
| CN | 104865652 A | 8/2015 |
| WO | 2009140324 A1 | 11/2009 |

\* cited by examiner

MODULE STRUCTURE

TECHNICAL FIELD

The present invention relates to the optical-electric module field in the field of optical communication, and particularly to a module structure.

BACKGROUND ART

In order to transmit more data in a limited space, minitype pluggable modules are increasingly more frequently employed in optical communication system devices, which has increasingly higher requirements on the reliability of the modules, whose cost becomes increasingly lower. Considering the mechanical structures of the modules, the installing and uninstalling devices are the core.

The currently used modes of installing and uninstalling the modules may employ pushing forward the slide block or tilting the latch of the shielding cage. FIG. 1 shows the exploded view of the module structure of the prior art that is provided by the present invention. As shown by FIG. 1, a circuit board 430 is placed within a base 600, an outer casing 100 is placed on an upper side of the circuit board 430 and is connected to the base 600, one end of the base is further provided with a brake plate 700 and a bail 800 and a positioning cover 300 for fixing the brake plate 700 and the bail 800 to the base 600, and the top end face of the base 600 is further provided with a latch. When the module structure is being inserted into the metal shielding cage of the system device, the latch on the base jacks up a spring leaf of the metal shielding cage and enters a clipping hole on the spring leaf, when the module structure is installed in the metal shielding cage of the system device. When the module structure is being uninstalled from the system device, the bail 800 is pulled, the bail 800 turns to drive the brake plate 700 to move toward the spring leaf of the metal shielding cage, and the brake plate 700 jacks the clipping hole on the spring leaf out of the latch on the base 600, and at this point a hand ring 600 is continuously pulled by hand to pull the module structure out along the metal shielding cage in the opposite direction to complete the uninstalling.

The defects of the module structures in the prior art include:

1. The pulling out of the bail 600 results in that after the uninstalling of the module structure from the system device is completed, the bail 600 cannot automatically reset, which is inconvenient to the usage. Further, in other patented techniques that have the automatic reset function, the brake plate must employ a die casting to realize automatic reset, which has complicated processing technique, and after long-term friction the coating layer gets worn, which affects the automatic reset function.

2. When the module structure is fixing the circuit board 430, it presses the circuit board 430 from the side by using an elastic stamping part, to fix the circuit board 430 to the base 600. However, all of the elastic structures for pressing the circuit board 430 have openings, which has poor electromagnetic shielding effect.

3. The side of the outer casing 100 of the module structure is provided with through holes, and the corresponding positions on the side of the base 600 are provided with protrusions. In the covering process the outer casing 100 nests from above the base 600 downwardly, to protrude the protrusions into the corresponding through holes to fix them. It is required that the edge of the outer casing 100 has a hook, which scrapes the base 600, and the process has the potential danger of hurting the coating of the base 600 by scraping.

SUMMARY OF THE INVENTION

The object of the embodiments of the present invention is to provide a module structure, to solve the problems of the prior art that the module structure cannot automatically reset, that the electromagnetic shielding effect is poor and that the assembling will easily scrape the base.

The present invention provides a module structure, wherein the module structure comprises a torsional spring that is fixed to a bail;

the torsional spring comprises a left torsional spring and a right torsional spring that are symmetrically provided on the bail;

the left torsional spring comprises a first supporting rod, a first screw hole, a first connecting rod and a second screw hole that are sequentially connected; and the right torsional spring comprises a second supporting rod, a third screw hole, a second connecting rod and a fourth screw hole that are sequentially connected;

the first supporting rod and the second supporting rod are in the form of a straight rod, and the first connecting rod and the second connecting rod are in the form of an L-shaped rod;

the second screw hole is nested outside a third rotation shaft of the bail, the first screw hole is nested outside a first rotation shaft after passing through the L-shaped-rod formed first connecting rod, and a direction of the first supporting rod is upwardly inclining and forms an angle of less than 90° with the plane where the bail is located; and the fourth screw hole is nested outside a fourth rotation shaft of the bail, the third screw hole is nested outside a second rotation shaft after passing through the L-shaped-rod formed second connecting rod, and a direction of the second supporting rod is upwardly inclining and forms an angle of less than 90° with the plane where the bail is located.

The advantageous effects of the present invention include:

1. The bail can automatically reset, without manual resetting, which has convenient usage;

2. The assembling of the parts of the installing and uninstalling device has high speed and good reliability; and 3. The module has no assembling gaps, which has good shielding effect.

BRIEF DESCRIPTION OF THE DRAWINGS

In order to more clearly illustrate the technical solutions of the embodiments of the present invention, the figures that are required to describe the embodiments or the prior art will be briefly introduced below. Apparently, the figures that are described below are merely embodiments of the present invention, and a person skilled in the art can obtain other figures according to these figures without paying creative work.

Figure 1:
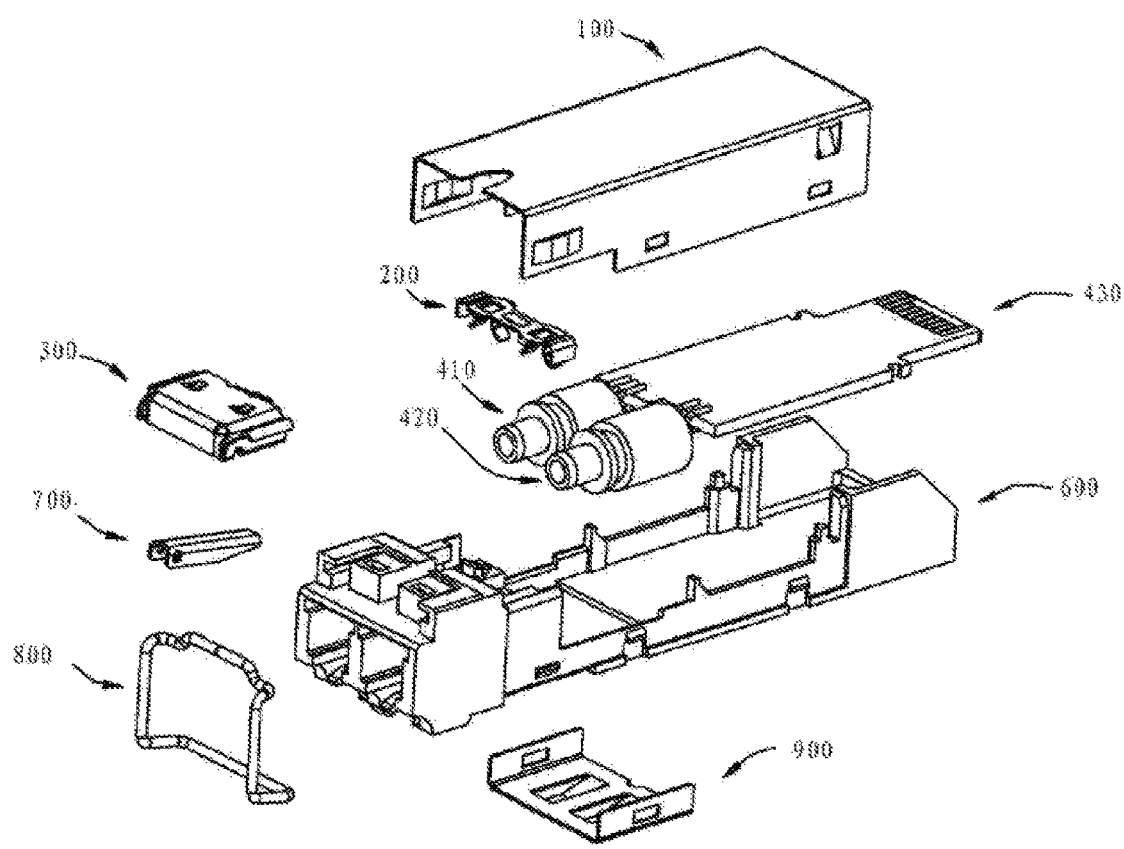
FIG. 1 is the exploded view of the module structure of the prior art that is provided by the present invention.

wherein, 100 denotes the outer casing, 101 the first inverse clip, 102 the second inverse clip, 103 the third inverse clip, 104 the fourth inverse clip, 105 the first elastic presser plate, 106 the second elastic presser plate, 107 the first buckle, 108 the second buckle, 109 the third buckle, 110 the fourth buckle, 111 the top face;

200 the fixture block, 201 the shielding adhesive;

300 the positioning cover, 301 the third sidewall, 302 the fourth sidewall, 303 the first retaining wall, 304 the second retaining wall, 305 the screen plate, 306 the fifth inverse clip, 307 the sixth inverse clip, 308 the pressure clip, 309 the first counterbore;

310 the second counterbore;

410 the detector;

420 the laser;

430 the circuit board;

500 the torsional spring;

501 the left torsional spring, 502 the right torsional spring, 5011 the first supporting rod, 5012 the second screw hole, 5013 the first screw hole, 5014 the first connecting rod, 5021 the second supporting rod, 5022 the fourth screw hole, 5023 the third screw hole, 5024 the second connecting rod;

600 the base, 601 the first clipping hole, 602 the second clipping hole, 603 the first guide slot, 604 the second guide slot, 605 the first limiting slot, 606 the second limiting slot, 607 the first depression, 608 the second depression, 609 the first sidewall, 610 the second sidewall, 611 the elongated slot, 612 the latch, 613 the third depression, 614 the fourth depression, 615 the fifth depression, 616 the sixth depression, 617 the seventh depression, 618 the eighth depression, 619 the first avoiding slot, 620 the second avoiding slot; 621 the cavity body;

622 the first bolt hole, 623 the second bolt hole;

700 the brake plate, 800 the bail, 801 the first rotation shaft, 802 the second rotation shaft, 803 the third rotation shaft, 804 the fourth rotation shaft, 805 the seam, 806 the first side arm, 807 the second side arm;

900 the elastic plate, 901 the seventh inverse clip, 902 the eighth inverse clip, 903 the fifth buckle, 904 the sixth buckle;

1000 the installing and uninstalling assembly;

2000 the first screw; 2001 the second screw.

DETAILED DESCRIPTION OF THE INVENTION

In order to make the purposes, the technical solutions and the advantages of the present invention more clear, the present invention will be further described in detail below by referring to the drawings and the embodiments. It should be understood that, the particular embodiments described herein are merely intended to explain the present invention, but are not to limit the present invention.

In order to illustrate the technical solutions of the present invention, it will be described below with reference to the particular embodiments.

Figure 2:
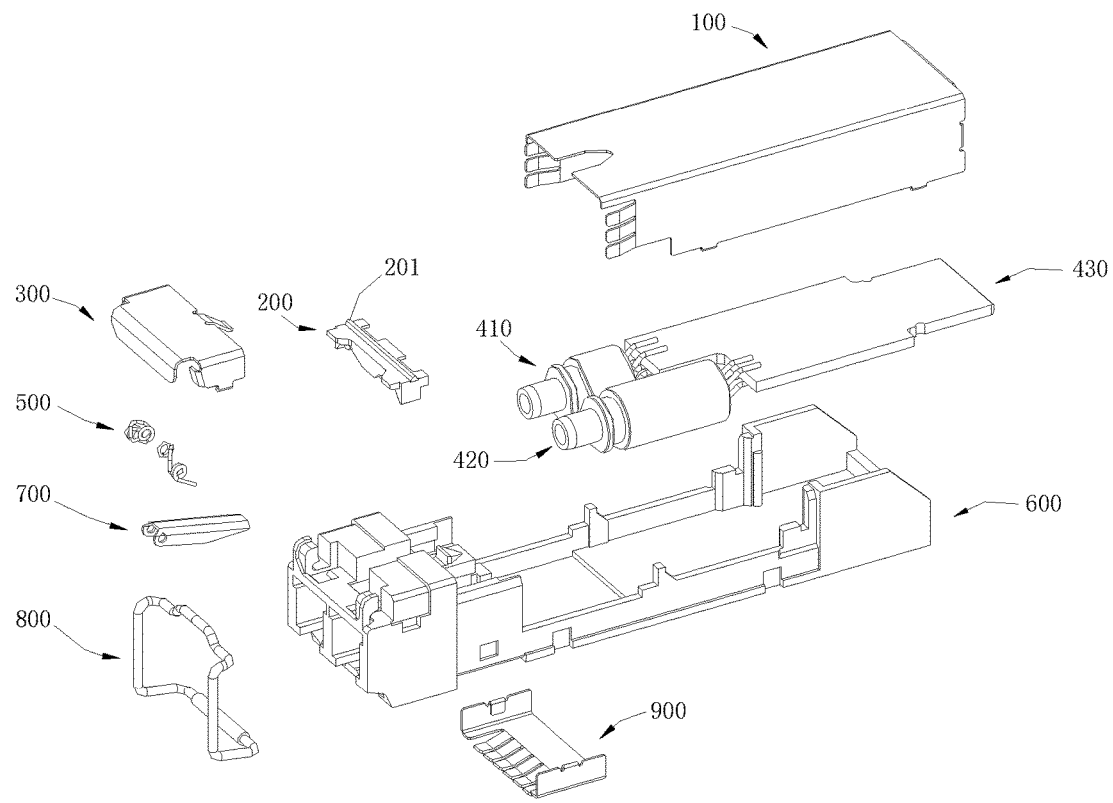
FIG. 2 is the exploded view of the module structure that is provided by the embodiments of the present invention.
Figure 3:
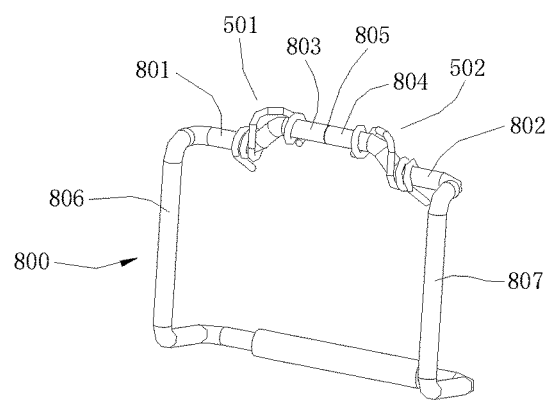
FIG. 3 is the perspective view of the assembly wherein the torsional spring is provided on the bail that is provided by the embodiments of the present invention.

FIG. 2 shows the exploded view of the module structure that is provided by the embodiments of the present invention. The present invention provides a module structure, and the module structure comprises a torsional spring 500 that is fixed to a bail 800. FIG. 3 shows the perspective view of the assembly wherein the torsional spring is provided on the bail that is provided by the present invention.

Figure 4:
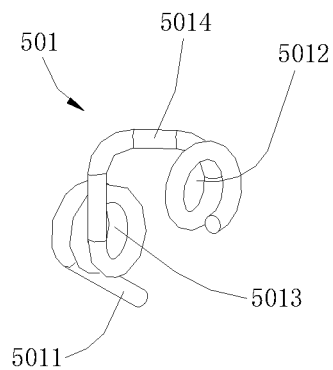
FIG. 4 is the perspective view of the left torsional spring that is provided by the embodiments of the present invention.
Figure 5:
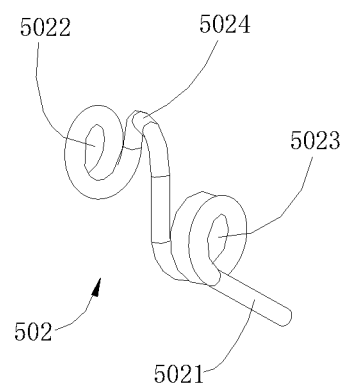
FIG. 5 is the perspective view of the right torsional spring that is provided by the embodiments of the present invention.

The torsional spring 500 comprises a left torsional spring 501 and a right torsional spring 502 that are symmetrically provided on the bail 800, which are made by bending a linear material that has screw holes. FIG. 4 and FIG. 5 respectively show the perspective views of the left torsional spring and the right torsional spring that are provided by the embodiments of the present invention.

It can be known from FIG. 4 and FIG. 5 that, the left torsional spring comprises a first supporting rod 5011, a first screw hole 5013, a first connecting rod 5014 and a second screw hole 5012 that are sequentially connected, and the right torsional spring comprises a second supporting rod 5021, a third screw hole 5023, a second connecting rod 5024 and a fourth screw hole 5022 that are sequentially connected.

The first supporting rod 5011 and the second supporting rod 5021 are in the form of a straight rod, and the first connecting rod 5014 and the second connecting rod 5024 are in the form of an L-shaped rod.

The bail 800 is a metal ring that has elasticity, and comprises an upper arm, a lower arm and two sidewalls, and the upper arm comprises a first rotation shaft 801, a third rotation shaft 803, a fourth rotation shaft 804 and a second rotation shaft 802 that are sequentially connected. The first rotation shaft 801 and the second rotation shaft 802 are concentric rotation shafts. The third rotation shaft 803 and the fourth rotation shaft 804 are concentric rotation shafts, and are provided with a seam 805 therebetween. The heights of the third rotation shaft 803 and the fourth rotation shaft 804 are greater than the heights of the first rotation shaft 801 and the second rotation shaft 802, and they are respectively connected to the first rotation shaft 801 and the second rotation shaft 802 by diagonal rods.

A first side arm 806 and a second side arm 807 are split, the first screw hole 5013 of the left torsional spring 501 is nested outside the first rotation shaft 801, and the second screw hole 5012 is nested outside the third rotation shaft 803 after passing through the L-shaped-rod formed first connecting rod 5014. The direction of the first supporting rod 5011 is upwardly inclining and forms an angle of less than 90° with the plane where the bail 800 is located.

The third screw hole 5023 of the right torsional spring 502 is nested outside the second rotation shaft 802, and the fourth screw hole 5022 is nested outside the fourth rotation shaft 804 after passing through the L-shaped-rod formed second connecting rod 5024. The direction of the second supporting rod 5021 is upwardly inclining and forms an angle of less than 90° with the plane where the bail 800 is located.

Figure 6:
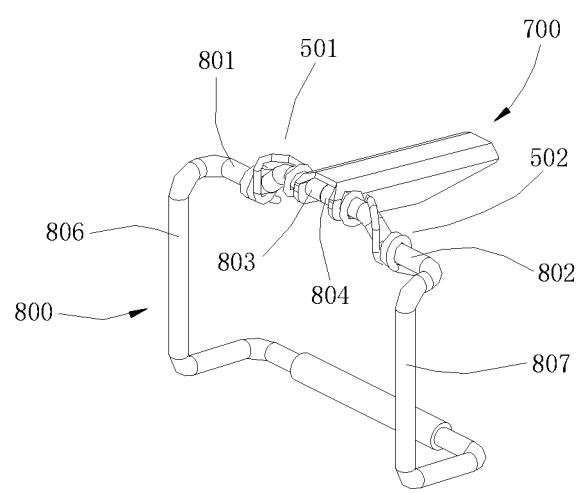
FIG. 6 is the first perspective view of the assembly wherein the torsional spring and the brake plate are provided on the bail that is provided by the embodiments of the present invention.
Figure 7:
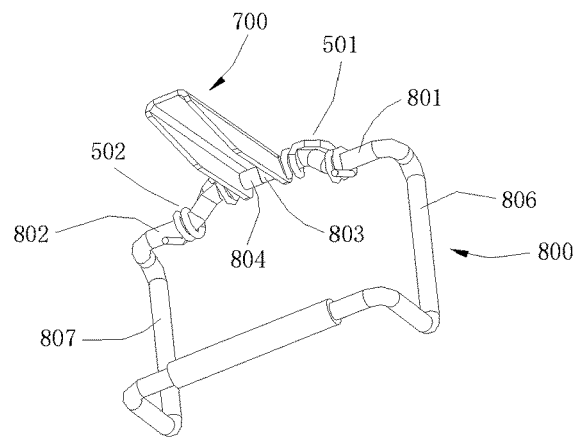
FIG. 7 is the second perspective view of the assembly wherein the torsional spring and the brake plate are provided on the bail that is provided by the embodiments of the present invention.

FIG. 6 and FIG. 7 show the first perspective view and the second perspective view from two visual angles of the assembly wherein the torsional spring and the brake plate are provided on the bail that is provided by the embodiments of the present invention.

A brake plate 700 is an elongated structure body that has round holes, and comprises a square brake plate base body, the brake plate base body is connected to sidewalls at the two longer sides, and the sidewalls have concentric round holes in the front. In the assembling process, the first side arm 806 and the second side arm 807 are split, the third rotation shaft 803 and the fourth rotation shaft 804 are provided in the round holes of the brake plate 700, and, in order to enhance the strength of the bail 800, the seam 805 may be welded after the brake plate 700 is completely assembled.

When the module structure is being uninstalled from system devices, the bail 800 is pulled, and the bail 800 turns to drive the brake plate 700 and the torsional spring 500 to move toward a spring leaf of a metal shielding cage. After the uninstalling is completed, the first supporting rod 5011 and the second supporting rod 5021 bear a base 600, and the generated torsion force enables the bail to automatically cling to the front end face of the base 600, to enable the bail 800 to automatically reset.

Figure 8:
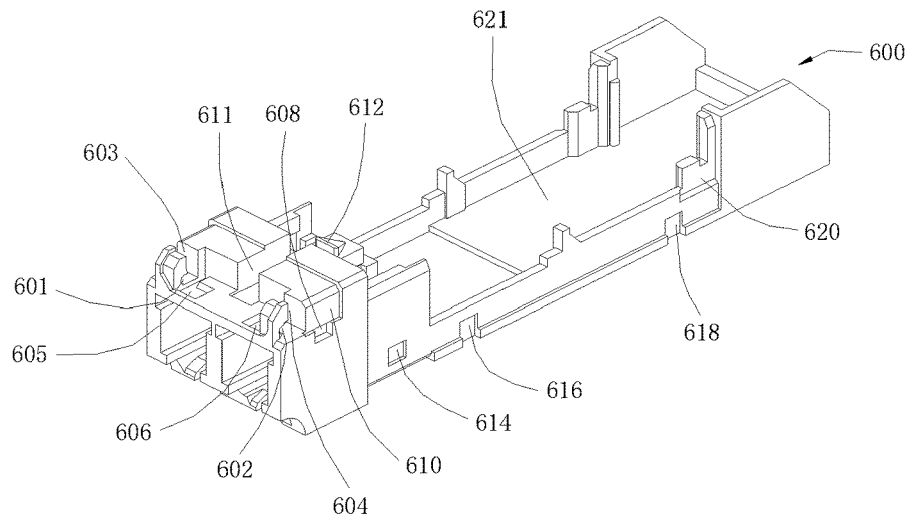
FIG. 8 is the first perspective view of the base that is provided by the embodiments of the present invention.
Figure 9:
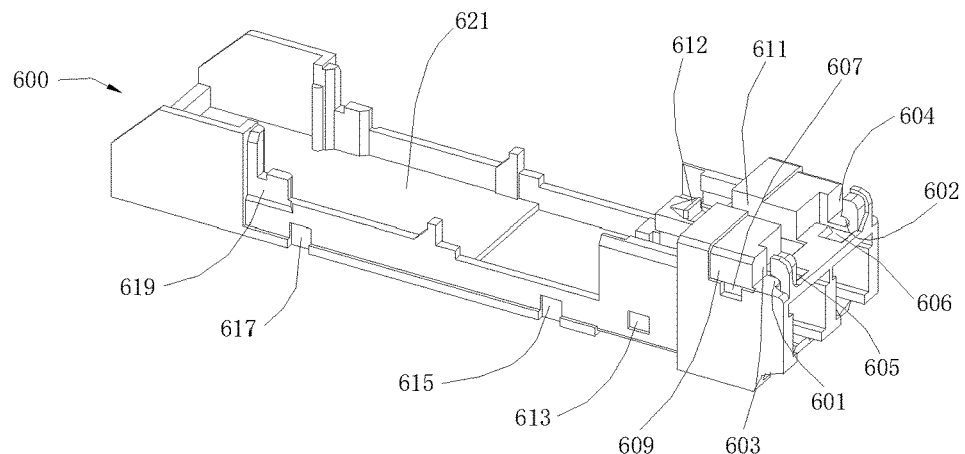
FIG. 9 is the second perspective view of the base that is provided by the embodiments of the present invention.

FIG. 8 and FIG. 9 show the first perspective view and the second perspective view from two visual angles of the base that is provided by the embodiments of the present invention. It can be known from FIG. 8 and FIG. 9 that, the base 600 is a metal elongated cavity body, and the cavity body 621 contains elements such as a fixture block 200, a detector 410, a laser 420 and a circuit board 430.

The front end of the cavity body 621 is a two-layer structure. A left side and a right side of an upper layer are respectively provided with a first sidewall 609 and a second sidewall 610; an elongated slot 611 whose opening direction is upward and axial direction is the front and back direction is provided between the first sidewall 609 and the second sidewall 610; and a first limiting slot 605 and a second limiting slot 606 that are symmetrical are provided on a lower bottom face of the upper layer, and a first clipping hole 601 and a second clipping hole 602 whose axial directions are the left and right direction are provided on a left side and a right side of the first limiting slot 605 and the second limiting slot 606.

The first rotation shaft 801 of the bail 800 is placed in the first clipping hole 601, and the second rotation shaft 802 of the bail 800 is placed in the second clipping hole 602; the first limiting slot 605 bears the first supporting rod 5011 of the left torsional spring 501, and the second limiting slot 606 bears the second supporting rod 5021 of the right torsional spring 502; and the brake plate 700 is placed in the elongated slot 611.

Further, a latch 612 is at the rear of the elongated slot 611; and a first guide slot 603 and a second guide slot 604 whose opening directions are upward are respectively provided behind the first clipping hole 601 and the second clipping hole 602.

Further, a third depression 613 and a fourth depression 614 that are symmetrical are respectively provided at an upper end and lower end of the sidewall of the base 600 that is adjacent to the front end. A fifth depression 615 and a seventh depression 617 are provided behind the third depression 613 and the fourth depression 614 and in the front and back direction of a bottom of a left sidewall of the base 600, and a sixth depression 616 and an eighth depression 618 whose positions respectively correspond to the fifth depression 615 and the seventh depression 617 are provided on a right sidewall. A first avoiding slot 619 and a second avoiding slot 620 that are symmetrical are provided on a left rear sidewall and a right rear sidewall of the seventh depression 617 and the eighth depression 618, and the opening directions of the first avoiding slot 619 and the second avoiding slot 620 are upward.

The embodiments of the module structure that is provided by the present invention further comprise a fixture block 200. The fixture block 200 is an elongated structure body that has shielding adhesive, and is provided between the detector 410, the laser 420 and the outer casing 100. The shielding adhesive is an elastomer, which results in that the pressures that the detector 410 and the laser 420 bear are elastic force.

The First Embodiment

Figure 10:
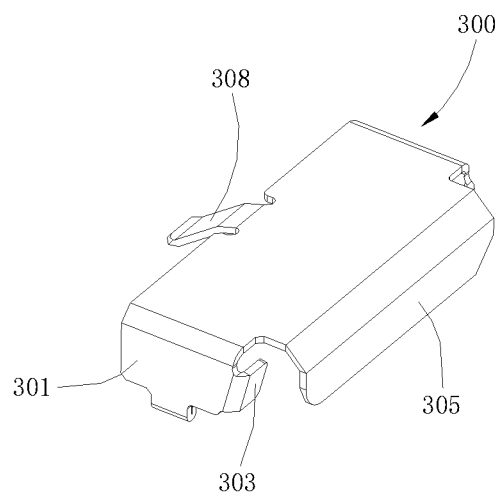
FIG. 10 is the first perspective view of the first embodiment of the positioning cover that is provided by the embodiments of the present invention.
Figure 11:
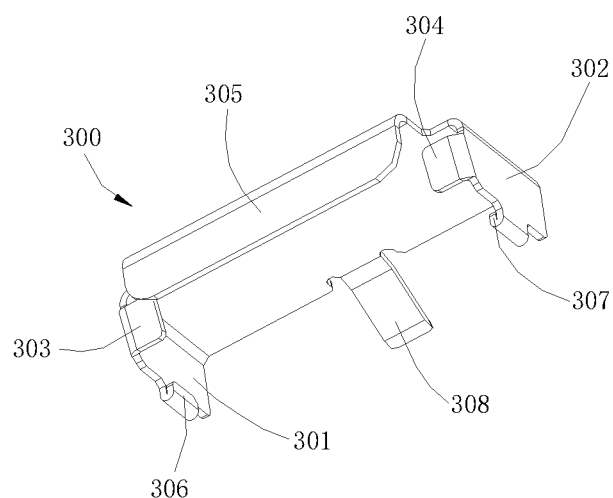
FIG. 11 is the second perspective view of the first embodiment of the positioning cover that is provided by the embodiments of the present invention.

The first embodiment that is provided by the present invention is the first embodiment of the positioning cover that is provided by the present invention. FIG. 10 and FIG. 11 respectively show the first perspective view and the second perspective view from two visual angles of the first embodiment of the positioning cover that is provided by the present invention.

It can be known from FIG. 10 and FIG. 11 that, in the first embodiment of the positioning cover that is provided by the present invention, the positioning cover 300 is an irregular metal plate structure body that has inverse clips and a pressure clip, and the positioning cover comprises a square positioning cover base body. Specifically:

The positioning cover base body is provided with a third sidewall 301 and a fourth sidewall 302 that extend downwardly from two sides; a fifth inverse clip 306 is provided at a lower horizontal edge of the third sidewall 301, and a sixth inverse clip 307 is provided at a lower horizontal edge of the fourth sidewall 302; a first retaining wall 303 that is perpendicular to the third sidewall 301 is provided at an edge of a front end of the third sidewall 301, and a second retaining wall 304 that is perpendicular to the fourth sidewall 302 is provided at an edge of a front end of the fourth sidewall 302; and a front end of the positioning cover base body extends downwardly to form a screen plate 305, and a rear end extends obliquely downwardly to form a pressure clip 308.

Figure 12:
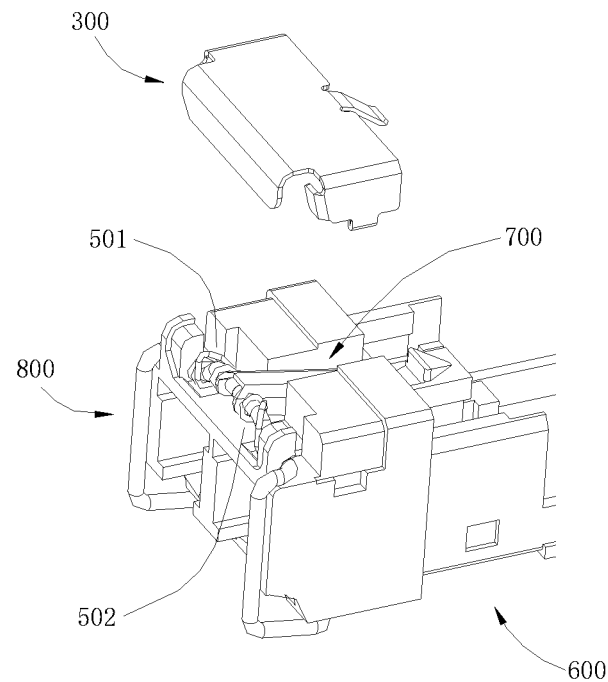
FIG. 12 is the exploded view of the combining and assembling between the first embodiment of the positioning cover and the base that is provided by the embodiments of the present invention.

FIG. 12 shows the exploded view of the combining and assembling between the first embodiment of the positioning cover and the base that is provided by the present invention.

The assembling relations are as follows:

The positioning cover 300 is located on the base 600, the bail 800, the brake plate 700 and the torsional spring 500; and the third sidewall 301 clings to the first sidewall 609 of the base 600, and the fourth sidewall 302 clings to the second sidewall 610 of the base 600.

A first depression 607 and a second depression 608 are respectively provided on lower parts of the first sidewall 609 and the second sidewall 610 at the front end of the base 600 and at the sidewall of the base 600; and the fifth inverse clip 306 is provided in the first depression 607 of the base 600, and the sixth inverse clip 307 is provided in the second depression 608 of the base 600.

The first retaining wall 303 is provided in the first guide slot 603 of the base 600, for preventing the first rotation shaft 801 of the bail 800 from escaping from the first clipping hole 601 of the base 600, and the second retaining wall 304 is provided in the second guide slot 604 of the base 600, for preventing the second rotation shaft 802 of the bail 800 from escaping from the second clipping hole 602 of the base 600; and the pressure clip 308 presses the brake plate 700 into the elongated slot 611 of the base 600.

The screen plate 305 forms a closed cavity body with the positioning cover 300 and the base 600 that have been assembled.

The Second Embodiment

Figure 13:
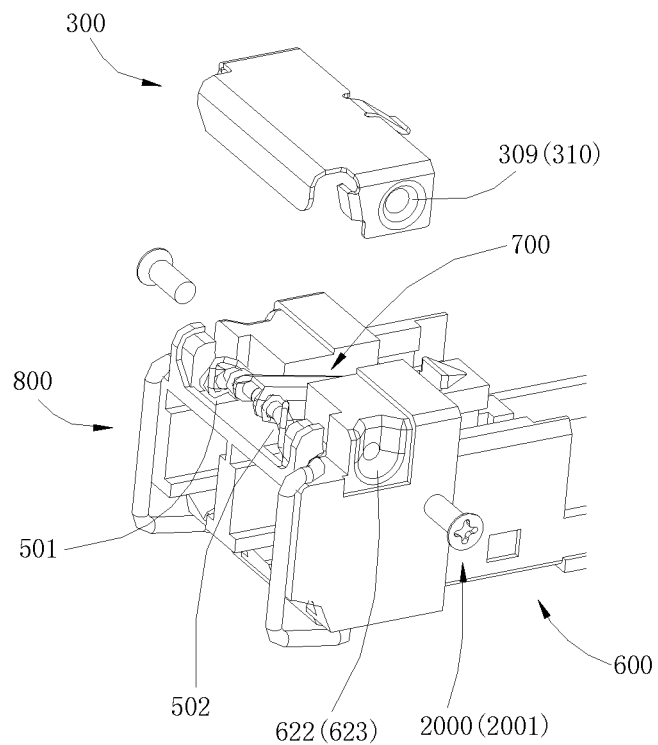
FIG. 13 is the exploded view of the combining and assembling between the second embodiment of the positioning cover and the base that is provided by the embodiments of the present invention.

The second embodiment that is provided by the present invention is the second embodiment of the positioning cover that is provided by the present invention. FIG. 13 shows the exploded view of the combining and assembling between the second embodiment of the positioning cover and the base that is provided by the present invention, and FIG. 14 shows the perspective view after the completing of the combining and assembling between the second embodiment of the positioning cover and the base that is provided by the present invention.

Figure 14:
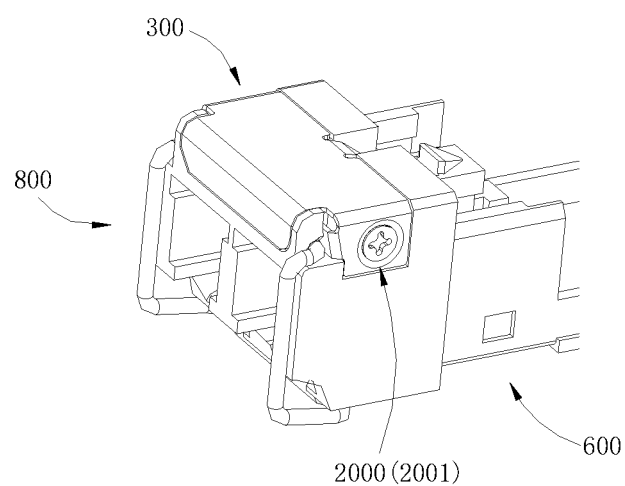
FIG. 14 is the perspective view after the completing of the combining and assembling between the second embodiment of the positioning cover and the base that is provided by the embodiments of the present invention.

It can be known from FIG. 13 and FIG. 14 that, in the second embodiment of the positioning cover that is provided by the present invention:

The positioning cover base body is provided with a third sidewall 301 and a fourth sidewall 302 that extend downwardly from two sides; a first counterbore 309 and a second counterbore 310 whose axial directions are the left and right direction are respectively provided on the third sidewall 301 and the fourth sidewall 302; a first retaining wall 303 that is perpendicular to the third sidewall 301 is provided at an edge of a front end of the third sidewall 301, and a second retaining wall 304 that is perpendicular to the fourth sidewall 302 is provided at an edge of a front end of the fourth sidewall 302; and a front end of the positioning cover base body extends downwardly to form a screen plate 305, and a rear end extends obliquely downwardly to form a pressure clip 308.

The assembling relations are as follows:

The positioning cover 300 is located on the base 600, the bail 800, the brake plate 700 and the torsional spring 500; and the third sidewall 301 clings to the first sidewall 609 of the base 600, and the fourth sidewall 302 clings to the second sidewall 610 of the base 600.

A first bolt hole 622 and a second bolt hole 623 are respectively provided on the first sidewall 609 and the second sidewall 610 at the front end of the base 600; the first counterbore 309 and the second counterbore 310 respectively correspond to the positions and the sizes of the first bolt hole 622 and the second bolt hole 623, and a first bolt 2000 passes through the first counterbore 309 and the first bolt hole 622, and a second bolt 2001 passes through the second counterbore 310 and the second bolt hole 623, to fix the positioning cover 300 to the base 600.

The first retaining wall 303 is provided in the first guide slot 603 of the base 600, for preventing the first rotation shaft 801 of the bail 800 from escaping from the first clipping hole 601 of the base 600, and the second retaining wall 304 is provided in the second guide slot 604 of the base 600, for preventing the second rotation shaft 802 of the bail 800 from escaping from the second clipping hole 602 of the base 600;

the pressure clip 308 presses the brake plate 700 onto the base 600; and the screen plate 305 forms a closed cavity body with the positioning cover 300 and the base 600 that have been assembled.

The Third Embodiment

Figure 15:
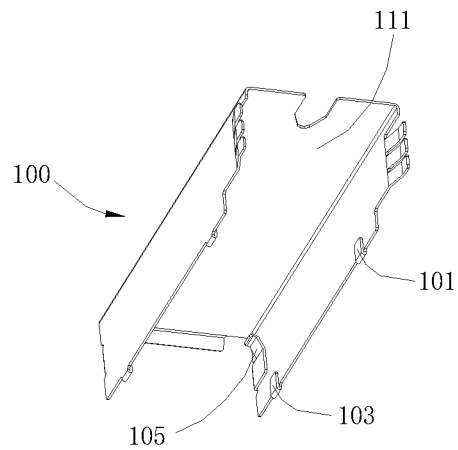
FIG. 15 is the first perspective view of the first embodiment of the outer casing that is provided by the embodiments of the present invention.
Figure 16:
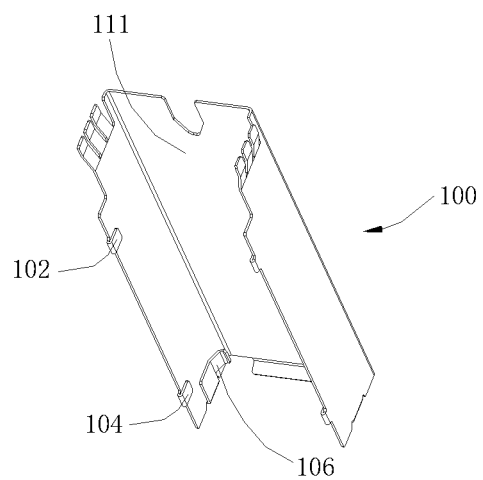
FIG. 16 is the second perspective view of the first embodiment of the outer casing that is provided by the embodiments of the present invention.

The third embodiment that is provided by the present invention is the first embodiment of the outer casing that is provided by the present invention. FIG. 15 and FIG. 16 respectively show the first perspective view and the second perspective view from two visual angles of the first embodiment of the outer casing that is provided by the present invention.

It can be known from FIG. 15 and FIG. 16 that, the outer casing 100 is an elongated metal plate structure body that comprises a top face 111, a left sidewall and a right sidewall. Specifically:

A first inverse clip 101 and a third inverse clip 103 are provided at the lower horizontal edge of the right sidewall of the outer casing, a second inverse clip 102 and a fourth inverse clip 104 whose positions respectively correspond to the first inverse clip 101 and the third inverse clip 103 are provided at the horizontal edge of the left sidewall, the inverse clip structures are formed by folding metal plates inwardly, and the number of the inverse clips may be less or more depending on the strength of the structure; and a first elastic presser plate 105 is provided at a vertical edge of the rear end of the right sidewall, and a second elastic presser plate 106 that is symmetrical with the first elastic presser plate 105 is provided at a vertical edge of the rear end of the left sidewall.

The top face 111 presses the detector 410 and the laser 420 onto the base 600 by pressing the fixture block 200.

The assembling relations are as follows:

The outer casing 100 covers the base 600, the first inverse clip 101 is provided in the sixth depression 616 of the base 600, the second inverse clip 102 is provided in the fifth depression 615 of the base 600, the third inverse clip 103 is provided in the eighth depression 618 of the base 600, and the fourth inverse clip 104 is provided in the first depression 617 of the base 600, to assemble the outer casing 100 onto the base 600, and after the assembling the outer casing 100 completely covers the fifth depression 615, the sixth depression 616, the seventh depression 617 and the eighth depression 618 on the side of the base 600, which avoids the problem of the exposing of the appearance of the base material that is caused by the scraping to the base during the outer casing assembling; and the first elastic presser plate 105 and the second elastic presser plate 106 individually elastically press the two sides of the circuit board 430, which structure has no opening, which results in that the shielding effect and dustproof effect are obviously superior to those of the prior art.

The Fourth Embodiment

Figure 17:
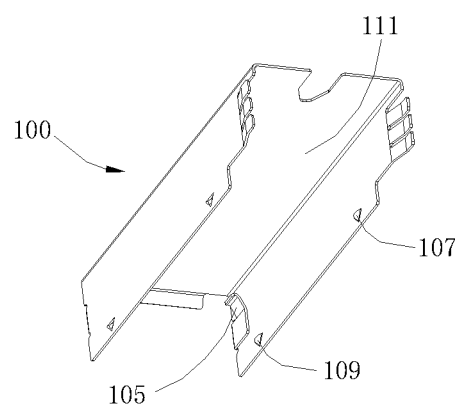
FIG. 17 is the first perspective view of the second embodiment of the outer casing that is provided by the embodiments of the present invention.
Figure 18:
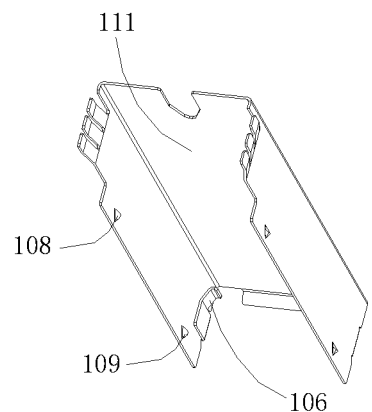
FIG. 18 is the second perspective view of the second embodiment of the outer casing that is provided by the embodiments of the present invention.

The fourth embodiment that is provided by the present invention is the second embodiment of the outer casing that is provided by the present invention. FIG. 17 and FIG. 18 respectively show the first perspective view and the second perspective view from two visual angles of the second embodiment of the outer casing that is provided by the present invention.

It can be known from FIG. 17 and FIG. 18 that, the outer casing 100 is an elongated metal plate structure body that comprises a top face 111, a left sidewall and a right sidewall. Specifically:

A first buckle 107 and a third buckle 109 are provided at the lower horizontal edge of the right sidewall of the outer casing, a second buckle 108 and a fourth buckle 110 whose positions respectively correspond to the first buckle 107 and the third buckle 109 are provided at the horizontal edge of the left sidewall, the buckles are protrusion structures that are formed by stamping a metal plate material inwardly, and the number of the buckles may be less or more depending on the strength of the structure; and a first elastic presser plate 105 is provided at a vertical edge of the rear end of the right sidewall, and a second elastic presser plate 106 that is symmetrical with the first elastic presser plate 105 is provided at a vertical edge of the rear end of the left sidewall.

The top face 111 presses the detector 410 and the laser 420 onto the base 600 by pressing the fixture block 200.

The assembling relations are as follows:

The outer casing 100 covers the base 600, the first buckle 107 is provided in the sixth depression 616 of the base 600, the second buckle 108 is provided in the fifth depression 615 of the base 600, the third buckle 109 is provided in the eighth depression 618 of the base 600, and the fourth buckle 110 is provided in the first depression 617 of the base 600, to assemble the outer casing 100 onto the base 600, and after the assembling the outer casing 100 completely covers the fifth depression 615, the sixth depression 616, the seventh depression 617 and the eighth depression 618 on the side of the base 600, which avoids the problem of the exposing of the appearance of the base material that is caused by the scraping to the base during the outer casing assembling; and the first elastic presser plate 105 and the second elastic presser plate 106 individually elastically press the two sides of the circuit board 430, which structure has no opening, which results in that the shielding effect and dustproof effect are obviously superior to those of the prior art.

The Fifth Embodiment

Figure 19:
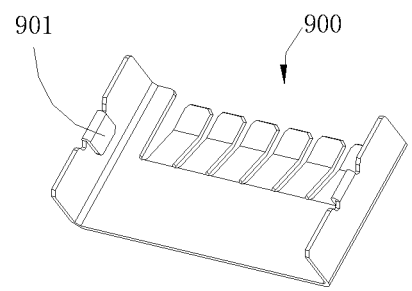
FIG. 19 is the first perspective view of the first embodiment of the elastic plate that is provided by the embodiments of the present invention.
Figure 20:
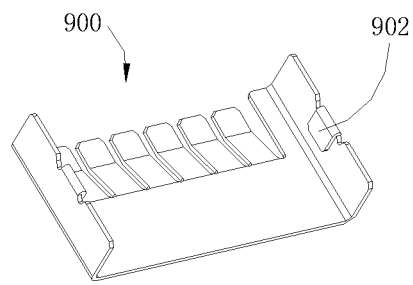
FIG. 20 is the second perspective view of the first embodiment of the elastic plate that is provided by the embodiments of the present invention.

The fifth embodiment that is provided by the present invention is the first embodiment of the elastic plate that is provided by the present invention. FIG. 19 and FIG. 20 respectively show the first perspective view and the second perspective view from two visual angles of the first embodiment of the elastic plate that is provided by the present invention.

It can be known from FIG. 19 and FIG. 20 that, the elastic plate 900 is a metal plate structure body that has an elastic structure, and a seventh inverse clip 901 and an eighth inverse clip 902 are respectively provided at upper horizontal edges of two sidewalls.

The assembling relations are as follows:

The elastic plate covers the base 600 from the bottom, the seventh inverse clip 901 is provided in the fourth depression 614 of the base 600, and the eighth inverse clip 902 is provided in the third depression 613 of the base 600, and after the assembling the elastic plate 900 completely covers the third depression 613 and the fourth depression 614 on the side of the base 600, which avoids the problem of the prior art of the exposing of the appearance of the base material that is caused by the scraping to the base during the assembling of the elastic plate 3300.

The Sixth Embodiment

Figure 21:
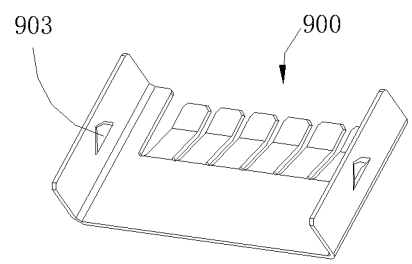
FIG. 21 is the first perspective view of the second embodiment of the elastic plate that is provided by the embodiments of the present invention.
Figure 22:
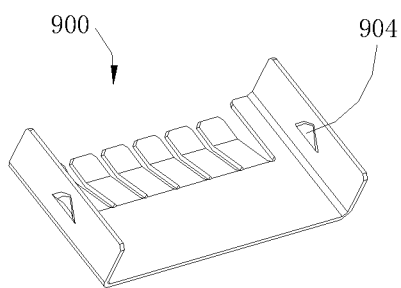
FIG. 22 is the second perspective view of the second embodiment of the elastic plate that is provided by the embodiments of the present invention.

The sixth embodiment that is provided by the present invention is the second embodiment of the elastic plate that is provided by the present invention. FIG. 21 and FIG. 22 respectively show the first perspective view and the second perspective view from two visual angles of the second embodiment of the elastic plate that is provided by the present invention.

It can be known from FIG. 21 and FIG. 22 that, the elastic plate 900 is a metal plate structure body that has an elastic structure, a fifth buckle 903 and a sixth buckle 904 are respectively provided on the two sidewalls of the elastic plate 900, and the fifth buckle 903 of the right sidewall and the sixth buckle 904 of the left sidewall are protrusion structures that are formed by stamping a metal plate material inwardly.

The assembling relations are as follows:

The elastic plate covers the base 600 from the bottom, the fifth buckle 903 is provided in the third depression 614 of the base 600, and the sixth buckle 904 is provided in the fourth depression 613 of the base 600, and after the assembling the elastic plate 900 completely covers the third depression 613 and the fourth depression 614 on the side of the base 600, which avoids the problem of the prior art of the exposing of the appearance of the base material that is caused by the scraping to the base during the assembling of the elastic plate 3300.

The installing steps of the installing and uninstalling device for a module structure that is provided by the present invention comprise:

1. splitting the seam 805 of the bail 800, and respectively nesting the left torsional spring 501 and the right torsional spring 502 onto the first rotation shaft 801 and the third rotation shaft 803, and the second rotation shaft 802 and the fourth rotation shaft 804, of the bail 800;

2. splitting the seam 805 of the bail 800, and nesting the round holes 701 (702) of the brake plate 700 onto the third rotation shaft 803 and the fourth rotation shaft 804 of the bail 800;

3. welding the seam 805 of the bail 800, to make the bail 800 a closed ring;

4. placing the assembly of the bail 800, the torsional spring 500 and the brake plate 700 at the upper front part of the base 600, wherein the first supporting rod 5011 of the left torsional spring 501 backwardly bears the first limiting slot 605 of the base 600, and the second supporting rod 5021 of the right torsional spring 502 backwardly bears the second limiting slot 606 of the base 600, so that the bail 800 bears the torsion force of the torsional spring 500 and clings to the front end face of the base 600; and 5. covering the positioning cover 300 at the upper front part of the base 600, so that the bail 800 will not escape from the base 600.

The installing steps of the module structure that is provided by the present invention comprise:

1. placing the detector 410, the laser 420 and the circuit board 430 into the cavity body 621 of the base 600;

2. placing the fixture block 200 onto the detector 410 and the laser 420;

3. covering the outer casing 600 onto the cavity body 621 of the base 600 from the top; and 4. covering the elastic plate 900 onto the base 600 from the bottom.

Figure 23:
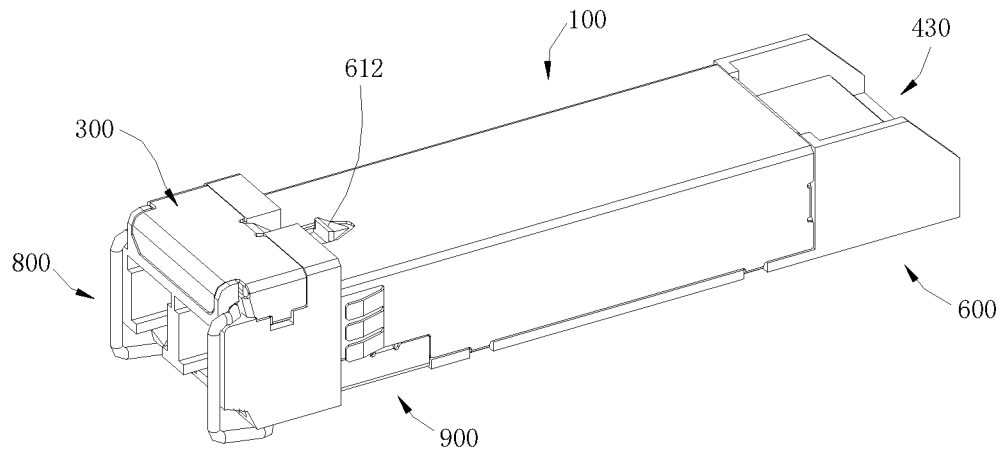
FIG. 23 is the perspective view after the installing is completed of the module structure that is provided by the embodiments of the present invention.

FIG. 23 shows the perspective view after the installing is completed of the module structure that is provided by the embodiments of the present invention.

The above description is merely preferable embodiments of the present invention, and is not indented to limit the present invention. Any modifications, equivalent substitutions and improvements that are made within the spirit and principle of the present invention should fall within the protection scope of the present invention.

What is claimed is:

1. A module structure, wherein, the module structure comprises a torsional spring (500) that is fixed to a bail (800);

the torsional spring (500) comprises a left torsional spring (501) and a right torsional spring (502) that are symmetrically provided on the bail (800);

the left torsional spring comprises a first supporting rod (5011), a first screw hole (5013), a first connecting rod (5014) and a second screw hole (5012) that are sequentially connected; and the right torsional spring comprises a second supporting rod (5021), a third screw hole (5023), a second connecting rod (5024) and a fourth screw hole (5022) that are sequentially connected;

the first supporting rod (5011) and the second supporting rod (5021) are in the form of a straight rod, and the first connecting rod (5014) and the second connecting rod (5024) are in the form of an L-shaped rod;

the second screw hole (5012) is nested outside a third rotation shaft (803) of the bail (800), the first screw hole (5013) is nested outside a first rotation shaft (801) after passing through the L-shaped-rod formed first connecting rod (5014), and a direction of the first supporting rod (5011) is upwardly inclining and forms an angle of less than 90° with the plane where the bail (800) is located; and the fourth screw hole (5022) is nested outside a fourth rotation shaft (804) of the bail (800), the third screw hole (5023) is nested outside a second rotation shaft (802) after passing through the L-shaped-rod formed second connecting rod (5024), and a direction of the second supporting rod (5021) is upwardly inclining and forms an angle of less than 90° with the plane where the bail (800) is located.

2. The module structure according to claim 1, wherein, the module structure further comprises a base (600);

the base (600) is a metal elongated cavity body, and a front end of the cavity body (621) is a two-layer structure;

a left side and a right side of an upper layer are respectively provided with a first sidewall (609) and a second sidewall (610);

an elongated slot (611) whose opening direction is upward and axial direction is the front and back direction is provided between the first sidewall (609) and the second sidewall (610); and a brake plate (700) is placed in the elongated slot (611);

a first limiting slot (605) and a second limiting slot (606) that are symmetrical are provided on a lower bottom face of the upper layer; and the first limiting slot (605) bears the first supporting rod (5011) of the left torsional spring (501), and the second limiting slot (606) bears the second supporting rod (5021) of the right torsional spring (502);

a first clipping hole (601) and a second clipping hole (602) whose axial directions are the left and right direction are provided on a left side and a right side of the first limiting slot (605) and the second limiting slot (606); and the first rotation shaft (801) of the bail (800) is placed in the first clipping hole (601), and the second rotation shaft (802) of the bail (800) is placed in the second clipping hole (602);

a first guide slot (603) and a second guide slot (604) whose opening directions are upward are respectively provided behind the first clipping hole (601) and the second clipping hole (602);

a third depression (613) and a fourth depression (614) that are symmetrical are respectively provided at an upper end and lower end of the sidewall of the base (600) that is adjacent to the front end;

a fifth depression (615) and a seventh depression (617) are provided behind the third depression (613) and the fourth depression (614) and in the front and back direction of a bottom of a left sidewall of the base (600), and a sixth depression (616) and an eighth depression (618) whose positions respectively correspond to the fifth depression (615) and the seventh depression (617) are provided on a right sidewall; and a first avoiding slot (619) and a second avoiding slot (620) that are symmetrical are provided on a left rear sidewall and a right rear sidewall of the seventh depression (617) and the eighth depression (618), and opening directions of the first avoiding slot (619) and the second avoiding slot (620) are upward.

3. The module structure according to claim 2, wherein, the module structure further comprises a positioning cover (300);

the positioning cover (300) comprises a square positioning cover base body;

the positioning cover base body is provided with a third sidewall (301) and a fourth sidewall (302) that extend downwardly from two sides;

a first retaining wall (303) that is perpendicular to the third sidewall (301) is provided at an edge of a front end of the third sidewall (301), and a second retaining wall (304) that is perpendicular to the fourth sidewall (302) is provided at an edge of a front end of the fourth sidewall (302);

a front end of the positioning cover base body extends downwardly to form a screen plate (305), and a rear end extends obliquely downwardly to form a pressure clip (308);

the third sidewall (301) clings to the first sidewall (609) of the base (600), and the fourth sidewall (302) clings to the second sidewall (610) of the base (600);

the first retaining wall (303) is provided in the first guide slot (603) of the base (600), and the second retaining wall (304) is provided in the second guide slot (604) of the base (600);

the pressure clip (308) presses the brake plate (700) into the elongated slot (611) of the base (600); and the screen plate (305) forms a closed cavity body with the positioning cover (300) and the base (600) that have been assembled.

4. The module structure according to claim 3, wherein, a fifth inverse clip (306) is provided at a lower horizontal edge of the third sidewall (301), and a sixth inverse clip (307) is provided at a lower horizontal edge of the fourth sidewall (302);

a first depression (607) and a second depression (608) are respectively provided on lower parts of the first sidewall (609) and the second sidewall (610) at the front end of the base (600) and at the sidewall of the base (600); and the fifth inverse clip (306) is provided in the first depression (607) of the base (600), and the sixth inverse clip (307) is provided in the second depression (608) of the base (600), to fix the positioning cover (300) to the base (600).

5. The module structure according to claim 3, wherein, a first counterbore (309) and a second counterbore (310) whose axial directions are the left and right direction are respectively provided on the third sidewall (301) and the fourth sidewall (302);

a first bolt hole (622) and a second bolt hole (623) are respectively provided on the first sidewall (609) and the second sidewall (610) at the front end of the base (600); and the first counterbore (309) and the second counterbore (310) respectively correspond to positions and sizes of the first bolt hole (622) and the second bolt hole (623), and a first bolt (2000) passes through the first counterbore (309) and the first bolt hole (622), and a second bolt (2001) passes through the second counterbore (310) and the second bolt hole (623), to fix the positioning cover (300) to the base (600).

6. The module structure according to claim 2, wherein, the module structure further comprises an outer casing (100);

the outer casing (100) is an elongated metal plate structure body that comprises a top face (111), a left sidewall and a right sidewall, and covers the base (600);

a first elastic presser plate (105) is provided at a vertical edge of the rear end of the right sidewall of the outer casing (100), and a second elastic presser plate (106) that is symmetrical with the first elastic presser plate (105) is provided at a vertical edge of the rear end of the left sidewall; and the top face (111) presses a detector (410) and a laser (420) on to the base (600) by pressing a fixture block (200).

7. The module structure according to claim 6, wherein, a first inverse clip (101) and a third inverse clip (103) are provided at the lower horizontal edge of the right sidewall of the outer casing (100), and a second inverse clip (102) and a fourth inverse clip (104) whose positions respectively correspond to the first inverse clip (101) and the third inverse clip (103) are provided at the horizontal edge of the left sidewall;

the inverse clip structures are formed by folding metal plates inwardly; and the first inverse clip (101) is provided in the sixth depression (616) of the base (600), the second inverse clip (102) is provided in the fifth depression (615) of the base (600), the third inverse clip (103) is provided in the eighth depression (618) of the base (600), and the fourth inverse clip (104) is provided in the first depression (617) of the base (600), to assemble the outer casing (100) on the base (600).

8. The module structure according to claim 6, wherein, a first buckle (107) and a third buckle (109) are provided at the lower horizontal edge of the right sidewall of the outer casing, and a second buckle (108) and a fourth buckle (110) whose positions respectively correspond to the first buckle (107) and the third buckle (109) are provided at the horizontal edge of the left sidewall;

the buckles are protrusion structures that are formed by stamping a metal plate material inwardly; and the first buckle (107) is provided in the sixth depression (616) of the base (600), the second buckle (108) is provided in the fifth depression (615) of the base (600), the third buckle (109) is provided in the eighth depression (618) of the base (600), and the fourth buckle (110) is provided in the first depression (617) of the base (600), to assemble the outer casing (100) on the base (600).

9. The module structure according to claim 2, wherein, the module structure further comprises an elastic plate (900);

the elastic plate (900) is a metal plate structure body that has an elastic structure, and a seventh inverse clip (901) and an eighth inverse clip (902) are respectively provided at upper horizontal edges of two sidewalls; and the elastic plate (900) covers the base (600) from the bottom, the seventh inverse clip (901) is provided in the fourth depression (614) of the base (600), and the eighth inverse clip (902) is provided in the third depression (613) of the base (600).

10. The module structure according to claim 2, wherein, a fifth buckle (903) and a sixth buckle (904) are respectively provided on the two sidewalls of the elastic plate (900), and the fifth buckle (903) of the right sidewall and the sixth buckle (904) of the right sidewall are protrusion structures that are formed by stamping a metal plate material inwardly; and the fifth buckle (903) is provided in the third depression (614) of the base (600), and the sixth buckle (904) is provided in the fourth depression (613) of the base (600).

\* \* \* \* \*